United States Patent [19]

Onan et al.

[11] Patent Number: 5,293,938
[45] Date of Patent: Mar. 15, 1994

[54] WELL COMPLETION AND REMEDIAL METHODS UTILIZING CEMENT-LADENED RUBBER

[75] Inventors: David D. Onan, Lawton; Garland W. Davis, Comanche; Roger S. Cromwell, Walters; Wendell D. Riley, Marlow, all of Okla.

[73] Assignee: Halliburton Company, Duncan, Okla.

[21] Appl. No.: 960,031

[22] Filed: Oct. 13, 1992

Related U.S. Application Data

[63] Continuation-in-part of Ser. No. 722,045, Jun. 27, 1991, Pat. No. 5,159,980.

[51] Int. Cl.$^5$ .............................................. E21B 33/14
[52] U.S. Cl. ..................................... 166/293; 523/130
[58] Field of Search ................. 166/293, 294; 523/130, 523/131, 132; 405/264, 265

[56] References Cited

U.S. PATENT DOCUMENTS

| | | | |
|---|---|---|---|
| 2,502,191 | 3/1950 | Williams | 166/293 X |
| 3,228,907 | 1/1966 | Eash | 524/3 |
| 3,952,805 | 4/1976 | Persinski et al. | 166/293 |
| 4,036,660 | 7/1977 | Persinski et al. | 166/293 X |
| 4,151,150 | 4/1979 | Peters et al. | 524/8 |
| 4,301,016 | 11/1981 | Carriere et al. | 523/130 X |
| 4,537,918 | 8/1985 | Parcevaux et al. | 523/130 |
| 4,649,998 | 3/1987 | Friedman | 166/294 |
| 4,721,160 | 1/1988 | Parcevaus et al. | 166/293 |
| 4,767,460 | 8/1988 | Parcevaux et al. | 523/130 |

OTHER PUBLICATIONS

Paper No. SPE 20453, "Cement Sheath Stress Failure" by K. J. Goodwin et al. (Presented in New Orleans, La., Sep. 23-26, 1990).

*Primary Examiner*—Stephen J. Novosad
*Attorney, Agent, or Firm*—Thomas R. Weaver

[57] ABSTRACT

A method of forming in a desired location in a well bore a dual-state composite of a hardened hydraulic cement and a solid rubber which features the use of a composition consisting essentially of a mixture of a slurry of a hydraulic cement and a vulcanizable rubber latex.

16 Claims, No Drawings

WELL COMPLETION AND REMEDIAL METHODS UTILIZING CEMENT-LADENED RUBBER

CROSS REFERENCE TO RELATED APPLICATION

This is a continuation-in-part of application Ser. No. 722,045 filed Jun. 27, 1991, now U.S. Pat. No. 5,159,980 issued Nov. 3, 1992.

BACKGROUND OF THE INVENTION

1. Field of the Invention

The present invention relates generally to oil and gas well completion and remedial methods, and more particularly, to well completion and remedial methods utilizing compositions consisting essentially of rubber latex and hydraulic cement.

2. Description of the Prior Art

A variety of oil and gas well completion and remedial methods have heretofore involved the use of hydraulic cement compositions. Such cement compositions have been and are usually comprised of a water slurry of Portland cement together with various additives such as set time accelerators, retarders, fluid loss reducers, dispersants, and the like. The cement slurries are pumped into completion or remedial locations within well bores and/or subterranean formations penetrated thereby and allowed to set into hard impermeable masses.

A principal well completion technique which utilizes a cement composition is known as primary well cementing. Primary well cementing involves placing a cement composition into the annulus between the walls of the well bore and a conduit, e.g., casing, disposed therein, and allowing the cement composition to set therein, whereby the exterior surfaces of the conduit are bonded to the walls of the well bore. The bonding of the conduit within the well bore serves to maintain the conduit in place and to prevent formation fluids from communicating between subterranean formations or zones or to the surface by way of the annulus.

Primary cementing operations utilizing hydraulic cement compositions have generally been very successful, however, when primary cementing is carried out in wells wherein high temperatures and/or high pressures are exerted on the casing or liners cemented therein, failure of the cement seal can occur with the result that pressurized fluids from subterranean formations or zones are allowed to flow therebetween or to the surface by way of the annulus. The failure of the primary cement in a well bore can bring about lost revenues as a result of lost production, and, because of escaping hydrocarbons, can create a highly dangerous well condition.

Failure of the primary cement sheath in a well bore can be due to the exposure of the metal conduit contacted by the cement in the well bore to high temperature as a result of hot fluids being produced from the well and/or to the exposure of the metal conduit to high internal test pressures or treatment fluid pressures. Such high temperature and pressure differentials cause the conduit to expand both diametrically and circumferentially which causes failure of the bond at the cement-casing interface and/or causes the cement sheath to fracture radially from the inner casing surface to the outer well bore wall.

In other well completion or remedial operations which utilize hydraulic cement compositions, e.g., secondary squeeze cementing and other similar operations wherein cracks, voids and other areas are filled with cement and sealed and/or whereby temporary or permanent cement plugs are formed in the well, desired results are often not achieved because the set cement lacks resilience, high tensile strength or acid and other chemical resistance. Thus, there is a need for an improved pumpable composition which will set into a hard impermeable mass for use in well completion and remedial methods which provides improved elasticity, resilience, tensile strength, chemical resistance and low permeability.

SUMMARY OF THE INVENTION

By the present invention, improved well completion and remedial methods are provided which meet the needs recited above. The methods comprise forming a temporary or permanent plug or seal in a well bore or in one or more subterranean formations penetrated by the well bore by placing at a desired location in the subterranean formations or in the well bore, or both, a composition consisting essentially of a mixture of a slurry of a hydraulic cement and a vulcanizable rubber latex and thereafter permitting the hydraulic cement to set and causing the rubber latex to vulcanize to thereby form a plug or seal in the location which consists of a dual-state composite of a hardened cement and a solid rubber.

The dual-state composite of this invention, when compared to set cement known in the prior art, has increased tensile and flexural strength.

The hydraulic cement utilized in this invention is added in dry form to the latex to thereby produce an aqueous slurry of cement and rubber latex. Accordingly, sufficient water must be available in the latex to permit complete hydration of the cement. Also it is necessary that the cement hydration be complete prior to vulcanization of the rubber; therefore, the cement hydration is accelerated or the vulcanization reaction is retarded or both.

A variety of vulcanizable rubber latex materials can be utilized in accordance with the present invention. Generally, such materials are comprised of an aqueous suspension of rubber, a vulcanizing agent and a vulcanization activator. The particular rubber and other components utilized in the latex are selected to provide the required time for placement of the latex prior to formation of the plugs or seals having the desired properties, e.g., elasticity, resilience, chemical resistance and low permeability.

Thus, it is a general object of the present invention to provide improved well completion and remedial methods which utilize hydraulic cement and rubber latex.

Another object of the present invention is the provision of a method for the primary bonding of a conduit, such as casing, within a well bore whereby a permanent bond and seal between the casing and the walls of the well bore is maintained even though the conduit is subsequently subjected to high temperature and/or pressure differentials.

A further object of the present invention is the provision of improved primary cementing, secondary squeeze operations and other similar well operations utilizing compositions consisting essentially of rubber latex and hydraulic cement whereby seals and plugs having high strength, elasticity, resilience, chemical resistance and low permeability are produced.

Other and further objects, features and advantages of the present invention will be readily apparent to those skilled in the art upon a reading of the description of preferred embodiments which follows.

DESCRIPTION OF PREFERRED EMBODIMENTS

The present invention provides an improved method of completing or performing remedial operations in one or more subterranean formations or in the well bore penetrating such formations whereby a temporary or permanent plug or seal is placed therein. The plug or seal formed consists of a dual-state composite of a hardened cement and a solid rubber having properties which are generally superior to a plug or seal formed of Portland cement, i.e., the composite plug or seal of the present invention has elasticity, resilience, tensile strength which can range from 500 psi to greater than 3000 psi, high resistance to acid or other chemical corrosiveness and low permeability.

The term "rubber", as used herein shall mean hydrocarbon polymers occurring naturally, e.g., natural rubber from trees, and any of the synthetic hydrocarbon polymers having properties of elongation or yield under stress and elastic recovery after vulcanization with sulfur or other crosslinking agent. The term "hydraulic cement", as used herein, shall mean all inorganic cementitious materials of known type which comprise compounds of calcium, aluminum, silicon, oxygen and/or sulfur which exhibit "hydraulic activity," that is, which set solid and harden in the presence of water. The terms "well completion methods" or "well completion operations" are used herein to mean any of the operations utilized for completing the preparation of a well for hydrocarbon production after it has been drilled including the primary cementing of casing and liners in the well bore; placing light weight flotation barriers over caverned liquid hydrocarbons; consolidating gravel packs or incompetent sands in formations and the like. The terms "remedial methods" or "remedial operations" are used herein to mean procedures carried out in subterranean formations or in well bores penetrating the formations to correct problems such as sealing leaks, cracks or voids, placing plugs in the well bore or in zones or formations containing undesirable fluids, placing temporary plugs in lieu of packers to isolate zones or formations, filling external casing packers and the like.

The methods of the present invention are particularly suitable for providing primary bonding between casing and/or liners disposed in well bores and the walls of the well bores, particularly where the casing or liners are subsequently subjected to high temperature and pressure differentials.

Primary cementing has heretofore been carried out by pumping a cement slurry downwardly through the casing or liner and then upwardly into the annulus between the external surfaces of the casing or liner and the walls of the well bore. After placement of the cement in the annulus, it is allowed to set into a hard impermeable mass. The cement provides a bond between the casing or liner and the walls of the well bore to thereby maintain the casing or liner in place and prevent communication between zones or formations which are penetrated by the well bore via the annulus.

The heretofore known primary cementing methods have been successful, but in some wells, and particularly where excessive flowing or steam injection temperatures exist at the surface or where high fluid pressures are exerted within the conduit, failures in the cement in the form of cracks or fractures have often been experienced. Such failures allow fluids to flow through the annulus from one formation to another or to the surface causing loss of production and causing the existence of dangerous conditions. The problem is particularly severe in hot deep wells or geothermal wells where the produced fluids flow through the well bore at a high temperature and where high fluid pressures are exerted on the cemented conduit during stimulation and test procedures. The conduit expands in the presence of high temperatures and internal pressures which creates a shearing force at the cement-casing interface causing failure of the seal between the cement and the conduit and/or fracturing of the cement radially from the conduit surface to the well bore walls.

The method of the present invention eliminates the above described problems by sealing the annulus between the well bore and a conduit disposed therein with a dual-state composite consisting of a hardened cement and a solid rubber. Thus, in accordance with the method of the present invention for sealing a conduit in a well bore, a composition consisting essentially of a mixture of a slurry of a hydraulic cement and a vulcanizable rubber latex is pumped downwardly through the conduit and upwardly to a desired location in the annulus between the conduit and the well bore wherein the hydraulic cement is allowed to set and the rubber latex is then allowed to vulcanize to thereby form a seal consisting of a dual-state composite of set cement and a solid rubber. The composite seal has high strength, high corrosion resistance and effectively bonds the external surfaces of the conduit to the walls of the well bore whereby fluid migration in the annulus is prevented. Because the composite seal has elasticity and resilience, the expansion of the conduit due to high temperatures and pressures exerted thereon does not cause the failure of the composite composition or diminish its sealing and bonding properties.

The methods of the present invention are particularly suitable for performing a variety of well completion and remedial operations in subterranean formations and the well bores penetrating such formations. For example, the methods of the present invention are particularly suitable for performing squeeze remedial operations wherein a sealant is forced into cracks and/or voids to provide a seal therein. Other operations in which the methods are particularly suitable include, but are not limited to, consolidating gravel packs or incompetent formations exposed to high temperatures and pressures, forming temporary or permanent plugs or packers in well bores including horizontal well bores, forming lightweight flotation barriers above liquid hydrocarbons in caverns and the like.

The methods of the present invention for forming temporary or permanent plugs or seals in a well bore or in one or more subterranean formations penetrated by the well bore generally comprise the steps of placing a slurry of a hydraulic cement and a vulcanizable rubber latex in the subterranean formations or in the well bore penetrating the formations at a desired location therein, and first allowing the cement to set and thereafter causing or otherwise allowing the rubber to vulcanize to thereby form a plug or seal consisting of a dual-state composite of set cement and solid rubber.

Dry hydraulic cement is mixed with the rubber latex to form a pumpable aqueous slurry of hydraulic cement and rubber latex. The water phase of the latex is used to hydrate the cement. Accordingly, the quantity of water required to obtain complete hydration of the cement is included in the latex and must be taken into consideration when the dry hydraulic cement is mixed with the latex. In view of the above, it is believed that the quantity of dry cement to be employed is in the range of from about 25 to about 150, preferably 50 to 100 and still more preferably in the range of from about 65 to about 80 weight parts of cement per 100 weight parts of latex.

Hydraulic cements useful herein include, but are not limited to, Portland Cement, fast setting or extra fast setting, sulfate resistant cement, modified cements, alumina cements, calcium aluminate cements, fly ash cements, silica fume and lime cements and slag cement. The cements can also include small particle size cement.

The vulcanizable rubber latex material is generally comprised of a pumpable aqueous dispersion or emulsion of rubber, a vulcanizing agent and a vulcanization activator. Other additives ca be included in the latex material to adjust and control the viscosity of the material, to change the time in which vulcanization takes place and/or to change other properties of the rubber latex material or the properties of the composite seal or plug formed to thereby provide properties best suited for the particular application and environment to which the plug or seal is subjected.

The term "pumpable" is used herein to mean that a given material has a viscosity and other properties of appropriate magnitude to enable it to be pumped to a desired location.

As indicated above, a variety of well known rubber materials can be utilized in accordance with the present invention. For example, natural rubber (cis-1,4-polyisoprene) in most of its modified types can be utilized. Synthetic polymers of various types can also be used including styrene-butadiene rubber (SBR), cis-1,4-polybutadiene rubber and blends thereof with natural rubber or styrene-butadiene rubber, high styrene resin, butyl rubber, ethylene-propylene rubbers (EPM and EPDM), neoprene rubber, nitrile rubber, cis-1,4-polyisoprene rubber, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber and polysulfide rubber. The rubber materials are commercially available in latex form, i.e., aqueous dispersions or emulsions which are utilized directly and to which the other components of the vulcanizable rubber latex materials are added.

The particular rubber latex utilized for a particular application is selected to provide the particular properties required for that application. For example, natural rubber is superior to styrene-butadiene rubber with respect to low heat build-up, resilience, tensile strength without reinforcement and hot tear strength. Styrene-butadiene rubber, on the other hand, is more resistant to abrasion and weathering.

Carbon black filled vulcanizates of cis-1,4-polybutadiene rubber exhibit low heat generation, high resilience and high abrasion resistance. Blends of cis-1,4-polybutadiene rubber and natural rubber or styrene-butadiene rubber provide improvements in selected properties. Butyl rubber, particularly with carbon black or other fillers, exhibits high impermeability to gases. Ethylene-propylene rubber is free of double bonds and therefore exhibits outstanding resistance to heat, oxygen and other degrading agents. Neoprene rubber has good resistance to heat, oil, and flame, has good resilience and has good gas impermeability. Nitrile rubber can be blended with natural rubber, polysulfide rubbers and various resins to obtain increased tensile strength. Silicone rubber generally has less desirable physical properties, but such properties can be improved by the incorporation of inorganic extenders such as titanium oxide, zinc oxide, iron oxide and silica therewith. Silicone rubber is the most stable and will remain flexible over a wide temperature range. Chlorosulfonated polyethylene rubber can be blended with other types of rubber to provide a wide range of properties.

Of the various rubber materials which can be utilized, natural rubber, cis-polyisoprene rubber, nitrile rubber, ethylene-propylene rubber, styrene-butadiene rubber, butyl rubber and neoprene rubber are generally preferred. For the primary bonding of a conduit in a well bore where the conduit will be subjected to high temperatures and pressures, fluorocarbon rubber is usually preferred.

Vulcanization of the rubber is the process that converts the rubber latex to a solid elastic and resilient state. The vulcanization process involves the crosslinking of the polymer chains and can be accomplished by incorporating one or more crosslinking agents in the rubber latex. The most common vulcanizing agent which can be utilized with a majority of the rubber materials described above is sulfur. Other compounds that can be used either with or without sulfur are organic peroxide compounds, azo compounds, phenolic curatives, benzoquinone derivatives, bismaleimides, selenium, tellurium, nitro compounds, resins, metal oxides, and organic sulfur compounds such as alkyl thiuram disulfides.

The rate of vulcanization increases exponentially with increases in temperature, and the time required for the vulcanization of a particular rubber latex can be varied over a wide range by the selection of a particular vulcanizing agent, vulcanizing accelerator or vulcanization inhibitor or mixtures of such components. In order to initiate the vulcanization, a vulcanization activator is generally included in the rubber latex. Particularly suitable vulcanization activators are fatty acids such as stearic acid, metallic oxides such as zinc oxide and mixtures of such compounds.

In order to shorten the vulcanization time beyond that obtainable by the selection of vulcanizing agents alone, a vulcanization accelerator can be included in the rubber latex. Such accelerators generally function to initiate free radicals and they are preferably selected from the group consisting of aldehyde amine compounds, guanidine compounds, sulfenamide compounds, thiuram sulfide compounds, thiazole compounds, thiazoline compounds, dithiocarbamate compounds and mercaptoimidazoline compounds.

Fillers or extenders can be included in the slurry of hydraulic cement and vulcanizable rubber latex to improve tensile strength and other properties. Examples of suitable extenders are carbon black, high styrene resins, inorganic fillers such as zinc oxide, amorphous and crystalline silica and other inert fillers such as whiting, clays, synthetic fibers, ground rubber, expanded perlites, natural and synthetic microspheres, and pressurized gas. Of these, carbon black, styrene resin, zinc oxide and silica are preferred where below normal fluid densities are not a requirement.

In order to protect the vulcanized rubber compounds from degradation due to heat, light, and the effects of exposure to atmospheric air, protective agents can be included in the rubber latex. Examples of such protective agents are substituted quinoline compounds, amine compounds and phenolic compounds.

It was mentioned earlier that the hydraulic cement portion of the cement-rubber latex slurry useful herein is allowed to hydrate before the rubber portion is caused to be vulcanized. Such a reaction order can be controlled and is controlled herein by recognizing that (1) the rate of rubber vulcanization increases exponentially with temperature increase, whereas the rate of cement hydration increase is, by comparison, more linear relative to increase in temperature and (2) the rate of hydration is believed to be more easily controlled at a given temperature than the rate of vulcanization. In view of the above, the practitioner should focus on the temperature at the placement location of the slurry for purposes of vulcanization and hydration control. Thus at higher downhole temperatures emphasis is placed on delay of vulcanization rate and at lower downhole temperatures emphasis is placed on acceleration of vulcanization rate; hydration rate is then appropriately controlled by known means.

A class of compounding materials for use as vulcanization retarders under higher temperature curing conditions would include salicylic acid, sodium acetate, phthalic anhydride, and N-cyclohexyl thiophthalimide. Use of these components, along with reducing the concentration(s) of activator(s), can facilitate usage under a wide range of downhole temperatures. The subject of acceleration has already been addressed.

Regarding cement hydration under either of the extremes, traditional hydraulic cement accelerators and retarders will suffice.

The final concentrations of components influencing the rates of vulcanization and hydration can be determined by standard tests performed to derive mixing and placement times, as well as cure development stages, all under simulated conditions.

An example of a vulcanizable rubber latex which includes natural rubber and which will vulcanize to form a solid rubber within a relatively short time period at the temperatures normally encountered in well completion operations is a pumpable aqueous dispersion comprised of 100 parts by weight natural rubber latex, 2.75 parts by weight sulfur vulcanizing agent, a vulcanization activator mixture comprised of 2 parts by weight stearic acid and 5 parts by weight zinc oxide, a vulcanization accelerator mixture comprised of 1 part by weight 2,2'-dithiobisbenzothiazole and 0.1 part by weight tetramethylthiuram disulfide, and an antioxidant comprised of a mixture of alkylated diphenyl amines.

An example of a cis-polyisoprene rubber latex which will vulcanize into a solid rubber mass and which is useful in well completion operations is a pumpable aqueous dispersion comprised of 100 parts by weight cis-polyisoprene latex, a vulcanizing agent comprised of 1.5 to 3 parts by weight sulfur, an activator mixture comprised of 2 to 4 parts by weight stearic acid and 3 to 5 parts by weight zinc oxide, an accelerator mixture comprised of 1 to 2 parts by weight n-cyclohexyl-benzothiazole-2-sulfenamide and 0.1 to 0.3 parts by weight tetramethylthiuram monosulfide, and an antioxidant comprised of 1 to 2 parts by weight of polybutylated bisphenol A.

An example of a nitrile rubber latex which will vulcanize into a solid rubber mass and which is useful in well completion operations is a pumpable aqueous dispersion comprised of 100 parts by weight nitrile rubber latex, 1.75 parts by weight of sulfur vulcanizing agent, an activator mixture comprised of 1 part by weight stearic acid and 5 parts by weight zinc oxide, an accelerator mixture comprised of 1.5 parts by weight 2,2'-dithio-bisbenzothiazole and 0.1 parts by weight tetramethylthiuram disulfide, and an antioxidant comprised of symmetrical dibetanapthyl-p-phenylenediamine.

An example of an ethylene-propylene rubber latex which will vulcanize into a solid rubber mass and which is useful in well completion operations is a pumpable aqueous dispersion comprised of 100 parts by weight ethylene-propylene rubber latex, a vulcanizing agent mixture comprised of 6 to 8 parts by weight of a 50 percent active blend of 2,5-bis(tert-butylperoxy)-2,5-dimethylhexane in an inert mineral carrier and 0.32 parts by weight sulfur, and an activator mixture comprised of 1 to 2 parts by weight calcium stearate and 3 to 5 parts by weight zinc oxide.

An example of a styrene-butadiene rubber latex which will vulcanize into a solid rubber mass and which is useful in well completion operations is a pumpable aqueous dispersion comprised of 100 parts by weight styrene-butadiene rubber latex, 2 parts by weight sulfur vulcanizing agent, an activator mixture comprised of 2 parts by weight stearic acid and 5 parts by weight zinc oxide, an accelerator mixture comprised of 1.5 parts by weight 2,2'-dithio-bisbenzo-thiazole and 0.1 part by weight of copper dimethyldithio-carbamate, and an antioxidant comprised of 1 part by weight of a mixture of alkylated diphenyl amines.

An example of a hydraulic cement-ladened styrene-butadiene rubber latex composition which will vulcanize into a high-modulus rubber mass and be useful in well completion operations is a pumpable aqueous dispersion of 100 parts by weight styrene-butadiene rubber latex, 2 parts by weight sulfur vulcanizing agent, an activator mixture comprised of 4 parts by weight stearic acid and 0.5 parts by weight zinc oxide, 2 parts by weight ammonium alkylbenzene sulfonate latex emulsion stabilizer, 1.3 parts by weight aqueous activated dithiocarbamate accelerator, and 70 parts by weight hydraulic cement with an alumina content of approximately 70 percent.

An example of a butyl rubber latex useful in well completion operations is a pumpable aqueous dispersion comprised of 100 parts by weight butyl rubber latex, 2 parts by weight sulfur vulcanizing agent, an activator mixture comprised of 5 parts by weight zinc oxide and 1 part by weight stearic acid and an accelerator mixture comprised of 0.5 parts by weight 2-mercaptobenzothiazole, 1 part by weight tetramethylthiuram disulfide and part by weight tellurium diethyldithiocarbamate.

An example of a neoprene rubber latex which is useful is a pumpable aqueous dispersion comprised of 100 parts by weight neoprene rubber latex, a vulcanizing agent mixture comprised of 4 parts by weight magnesia and 5 parts by weight zinc oxide, an antioxidant comprised of 2 parts by weight of a mixture of alkylated diphenyl amines, and modifiers comprised of 0.5 parts by weight stearic acid and 0.5 parts by weight 2,2,'-dithiobisbenzothiazole.

The rubber latex can be modified to increase or decrease their densities as required by particular applications. For example, if a heavy latex is required, density increasing additives can be included and if a lightweight latex is required, they can be foamed with an inert gas such as nitrogen.

An example of a heavyweight extended rubber latex useful in well completion operations is a pumpable aqueous dispersion comprised of 100 parts by weight of styrene-butadiene rubber latex, 2 parts by weight sulfur vulcanizing agent, 2.5 parts by weight of a 2-mercaptobenzo-thiazole accelerator, an activator mixture comprised of 2 parts by weight stearic acid and 5 parts by weight zinc oxide, 0.4 part by weight of a silicone derivative defoamer, 0.1 part by weight of a hydroxyethylcellulose suspension aid, 100 parts by weight of 20/40 mesh sand, 100 parts by weight 40/60 mesh sand, 100 parts by weight silica flour and 1.0 part by weight of an antioxidant comprised of alkylated diphenyl amines.

An example of a lightweight extended rubber latex is a pumpable aqueous dispersion comprised of 100 parts by weight nitrile rubber latex, 1.75 parts by weight of sulfur vulcanizing agent, 1.5 parts by weight of a benzothiazyl disulfide accelerator, an activator mixture of 1 part by weight stearic acid and 5 parts by weight zinc oxide, 0.25 part by weight of hydroxyethylcellulose suspension aid, 1.5 parts by weight of an ethoxylated linear alcohol sulfonate foaming surfactant, 1 part by weight of a foam stabilizing surfactant comprised of capped polyethylene oxide and sufficient nitrogen gas to form a lightweight foam.

Test samples of one or more of the above described latexes having desired properties can be prepared and tested at the particular temperature and other conditions to be encountered in a particular well to be treated to thereby determine the time required for the latex to vulcanize into a solid rubber mass, the properties of the latex and vulcanized rubber formed and other variables. The quantities of the various components in the latexes can be varied to produce desired results. Once the particular vulcanizable rubber latex to be utilized has been selected, a well completion method using the latex is performed on the well. Generally, the rubber latex can be made to vulcanize and form solid rubber masses in time periods in the range of from less than one hour to about eight hours at temperatures in the range of from about 80° F. to about 450° F.

Thus, the present invention is well adapted to carry out the objects and attain the ends and advantages mentioned as well as those which are inherent therein. While numerous changes can be made to the presently preferred embodiments of the methods and compositions of the present invention which are described herein, such changes are within the spirit of this invention as defined by the appended claims.

What is claimed is:

1. A method of forming a temporary or permanent plug or seal in a well bore or in one or more subterranean formations penetrated by the well bore comprising the steps of:
   (a) placing a composition consisting essentially of a mixture of a slurry of a hydraulic cement and a vulcanizable rubber latex in said one or more subterranean formations or in said well bore at a desired location therein; and thereafter
   (b) permitting said hydraulic cement to set and then causing said rubber latex to vulcanize and thereby form in said location a plug or seal which consists of a dual-state composite of a hardened cement and a solid rubber wherein said vulcanizable rubber latex is comprised of an aqueous suspension of rubber, a vulcanizing agent and a vulcanizing activator selected from the group consisting of fatty acids, metallic oxide compounds and mixtures of such compounds.

2. The method of claim wherein said rubber is selected from the group consisting of natural rubber, cis-polyisoprene rubber, nitrile rubber, ethylene-propylene rubber, styrene-butadiene rubber, butyl rubber and neoprene rubber.

3. The method of claim 1 wherein said vulcanizing agent is selected from the group consisting of sulfur, organic peroxide compounds, azo compounds, phenolic curatives, benzoquinone derivatives, bismaleimides, selenium, tellurium, nitro compounds, resins, metal oxides, organic sulfur compounds and mixtures of such compounds.

4. The method of claim 1 wherein said composition is further characterized to include a vulcanization accelerator selected from the group consisting of aldehyde amine compounds, guanidine compounds, sulfenamide compounds, thiuram sulfide compounds, thiazole compounds, thiazoline compounds, dithiocarbamate compounds and mercaptoimidazoline compounds.

5. The method of claim 1 wherein said composition is further characterized to include an extender selected from the group consisting of carbon black, styrene resins, zinc oxide, silica, whiting, clays, synthetic fibers, ground rubber, expanded perlites and microspheres.

6. A method of sealing the annulus between a well bore and a conduit disposed therein comprising the steps of:
   (a) pumping a composition consisting essentially of a mixture of a slurry of a hydraulic cement and a vulcanizable rubber latex downwardly through said conduit and upwardly into said annulus; and
   (b) allowing said hydraulic cement to set and then allowing said rubber to vulcanize to thereby form in said annulus a solid seal consisting of a dual-state composite of set cement and a solid rubber wherein said vulcanizable rubber latex is comprised of an aqueous suspension of rubber, a vulcanizing agent and a vulcanizing activator selected from the group consisting of fatty acids, metallic oxide compounds and mixtures of such compounds.

7. The method of claim 6 wherein said rubber is selected from the group consisting of natural rubber, cis-polyisoprene rubber, nitrile rubber, ethylene-propylene rubber, styrene-butadiene rubber, butyl rubber and neoprene rubber.

8. The method of claim 7 wherein said vulcanizing agent is selected from the group consisting of sulfur, organic peroxide compounds, azo compounds, phenolic curatives, benzoquinone derivatives, bismaleimides, selenium, tellurium, nitro compounds, resins, metal oxides, organic sulfur compounds and mixtures of such compounds.

9. The method of claim 8 wherein said composition is further characterized to include a vulcanization accelerator selected from the group consisting of aldehyde amine compounds, guanidine compounds, sulfenamide compounds, thiuram sulfide compounds, thiazole compounds, thiazoline compounds, dithiocarbamate compounds and mercaptoimidazoline compounds.

10. The method of claim 9 wherein said composition is further characterized to include an extender selected from the group consisting of carbon black, styrene resins, zinc oxide, silica whiting, clays, synthetic fibers, ground rubber, expanded perlites and microspheres.

11. A method of forming a temporary or permanent seal or plug in a well bore or in one or more subterranean formations penetrated by the well bore comprising the steps of:

(a) pumping a composition consisting essentially of a mixture of a slurry of a hydraulic cement and a vulcanizable rubber latex into said well bore or into said one or more subterranean formations to a desired location therein, said rubber latex being comprised of an aqueous suspension or rubber, a vulcanizing agent and a vulcanization activator and said hydraulic cement being comprised of compounds of calcium, aluminum, silicon, oxygen and/or sulfur having hydraulic activity;

(b) allowing said hydraulic cement to set and then allowing said rubber to vulcanize to thereby form in said location a plug or seal which consists of a dual-state composite of a hardened cement and a solid rubber wherein said vulcanization activator is selected from the group consisting of fatty acids, metallic oxide compounds and mixtures of such compounds.

12. The method of claim 11 wherein said rubber is selected from the group consisting of natural rubber, cis-polyisoprene rubber, nitrile rubber, ethylene-propylene rubber, styrene-butadiene rubber, butyl rubber and neoprene rubber.

13. The method of claim 12 wherein said vulcanizing agent is selected from the group consisting of sulfur, organic peroxide compounds, azo compounds, phenolic curatives, benzoquinone derivatives, bismaleimides, selenium, tellurium, nitro compounds, resins, metal oxides, organic sulfur compounds and mixtures of such compounds.

14. The method of claim 13 wherein said vulcanizable rubber latex is further characterized to include a vulcanization accelerator selected from the group consisting of aldehyde amine compounds, guanidine compounds, sulfenamide compounds, thiuram sulfide compounds, thiazole compounds, thiazoline compounds, dithiocarbamate compounds and mercaptoimidazoline compounds.

15. The method of claim 14 wherein said composition is further characterized to include an extender selected from the group consisting of carbon black, styrene resins, zinc oxide, silica, whiting, clays, synthetic fibers, ground rubber, expanded perlites and microspheres.

16. The method of claim 15 wherein said hydraulic cement is present in said composition in an amount in the range of from about 25 to about 150 weight parts per 100 weight parts of said latex.

* * * * *